United States Patent
Brommer et al.

(10) Patent No.: US 9,342,989 B2
(45) Date of Patent: May 17, 2016

(54) RADIO-ENABLED COLLISION AVOIDANCE SYSTEM

(71) Applicant: BAE Systems Information and Electronic Systems Integration Inc., Nashua, NH (US)

(72) Inventors: Karl D. Brommer, Exeter, NH (US); Sterling J. Anderson, Allston, MA (US); Dieter B. Brommer, Cambridge, MA (US); Karl D. Iagnemma, Cambridge, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 76 days.

(21) Appl. No.: 13/932,679

(22) Filed: Jul. 1, 2013

(65) Prior Publication Data

US 2014/0005874 A1    Jan. 2, 2014

Related U.S. Application Data

(60) Provisional application No. 61/666,315, filed on Jun. 29, 2012.

(51) Int. Cl.
   *G08G 9/02* (2006.01)
   *G01S 13/93* (2006.01)
   *G01S 13/75* (2006.01)
   *B60W 30/095* (2012.01)

(52) U.S. Cl.
   CPC .............. *G08G 9/02* (2013.01); *B60W 30/095* (2013.01); *G01S 13/75* (2013.01); *G01S 13/931* (2013.01)

(58) Field of Classification Search
   CPC ... G06K 7/10366; G01S 13/66; G01S 13/825; G01S 5/0027; G01S 13/931; B60Q 9/008; G08G 9/02; B60W 30/09
   See application file for complete search history.

(56) References Cited

U.S. PATENT DOCUMENTS

| | | | |
|---|---|---|---|
| 6,614,387 B1 * | 9/2003 | Deadman | G01S 13/825 340/435 |
| 7,002,461 B2 * | 2/2006 | Duncan | G01S 5/0027 340/10.1 |
| 7,924,160 B1 * | 4/2011 | LaPenta et al. | 340/572.4 |

(Continued)

FOREIGN PATENT DOCUMENTS

| | | |
|---|---|---|
| WO | 2011/009009 | 1/2011 |
| WO | 2011/009011 | 1/2011 |

OTHER PUBLICATIONS

Anderson et al., An optimal-control-based framework for trajectory planning, threat assessment, and semi-autonomous control of passenger vehicles in hazard avoidance scenarios. Int. J. Vehicle Autonomous Systems, vol. 8, Nos. 2/3/4, 2010.

*Primary Examiner* — Bao Long T Nguyen
(74) *Attorney, Agent, or Firm* — Daniel J. Long; Sand & Sebolt

(57) ABSTRACT

In the method of reducing the likelihood of collisions, the improvement comprising the step of embedding passive radio transponders in a tape, grease, or other materials; applying said passive radio transponders to an object of which collisions must be avoided, and mounting an active interrogating transponder on a moving machinery, which uses the information provided by the radio transponders to semi-autonomously avoid collisions.

13 Claims, 15 Drawing Sheets

(56) References Cited

U.S. PATENT DOCUMENTS

| | | | |
|---|---|---|---|
| 7,970,357 B2 | 6/2011 | Gili et al. | |
| 8,010,048 B2 | 8/2011 | Brommer et al. | |
| 8,044,797 B2 | 10/2011 | Brommer et al. | |
| 8,094,008 B2 * | 1/2012 | Solie | G01D 21/00 310/313 D |
| 8,446,254 B2 * | 5/2013 | Carrick et al. | 340/10.1 |
| 2005/0246094 A1 * | 11/2005 | Moscatiello | 701/207 |
| 2006/0244568 A1 * | 11/2006 | Tong et al. | 340/10.41 |
| 2007/0035383 A1 * | 2/2007 | Roemerman et al. | 340/10.1 |
| 2008/0030345 A1 * | 2/2008 | Austin | A61B 19/44 340/572.8 |
| 2008/0228400 A1 * | 9/2008 | Wheeler | E01F 9/083 701/301 |
| 2009/0002193 A1 * | 1/2009 | Cemper | 340/901 |
| 2009/0040025 A1 * | 2/2009 | Volpi | G01S 13/751 340/10.1 |
| 2010/0228427 A1 | 9/2010 | Anderson et al. | |
| 2012/0083947 A1 | 4/2012 | Anderson et al. | |
| 2012/0109610 A1 | 5/2012 | Anderson et al. | |
| 2012/0154174 A1 * | 6/2012 | Schunder | 340/905 |

* cited by examiner

7. Plastic installation

CONVENTIONAL FREE-SPACE ANTENNA INCLUDING RFID COIL ANTENNA SHOWN

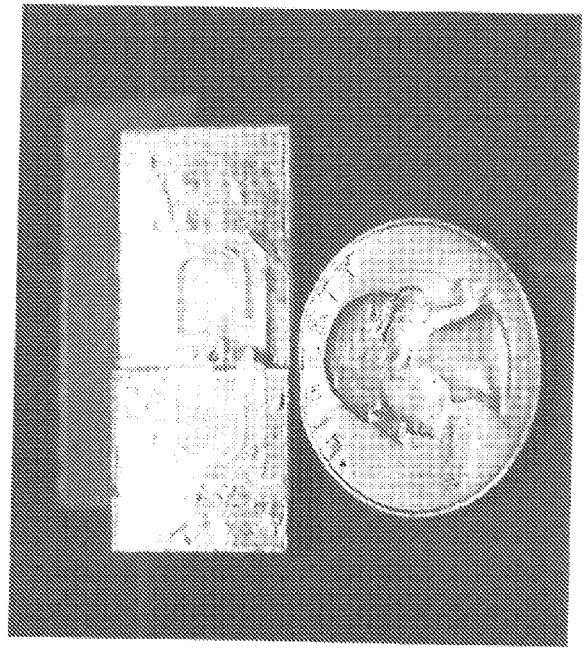
RFID ANTENNA AND SUBSTRATE DESIGNED FOR METAL CAN ENHANCE RETURN
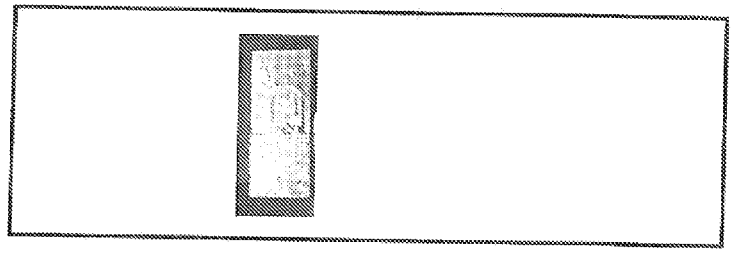
8. Metal Installation
Fig. 8

10. Tape embedded with RFID tags

11. Backscatter tag

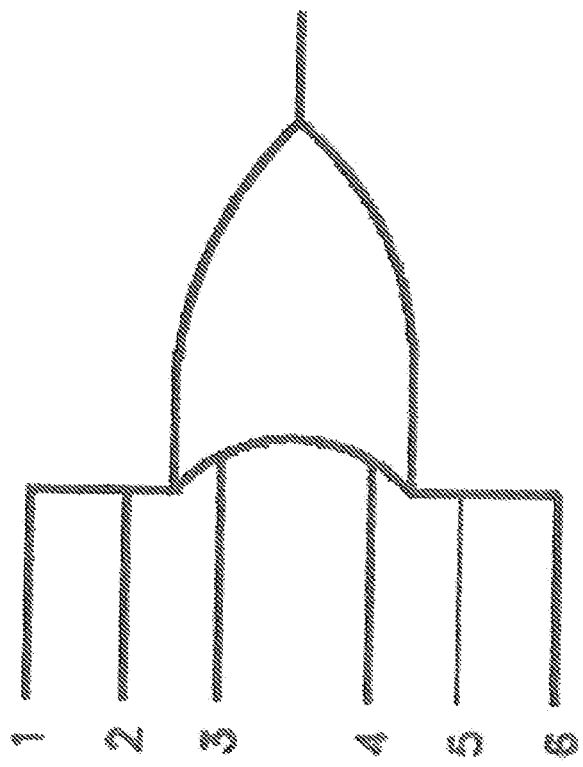

US 9,342,989 B2

RADIO-ENABLED COLLISION AVOIDANCE SYSTEM

CROSS REFERENCE TO RELATED APPLICATION

This application claims rights under 35 U.S.C. 119(e) from Application Ser. No. 61/666,315 filed Jun. 29, 2012, the contents of which are incorporated herein by reference.

FIELD OF THE INVENTION

The present invention relates to radio sensors and methods for using them and the information they provide to systematically help avoid collisions between machinery and obstacles/pedestrians.

BRIEF DESCRIPTION OF PRIOR DEVELOPMENTS

In the majority of applications today, sensing systems that are used on vehicles require an expensive array of laser, radar, and camera-based instrumentation. The combination of these components requires intensive and often variable signal processing in order to estimate the position of hazards in the environment. Even if such sensing systems were technically and financially feasible for manufacturers and end users, they would require significant re-working to allow operators to mark certain regions of the environment as being unsafe. This marking would have to be done in software, using, for example, an operator interface whereby the user delineates unsafe regions and the software attempts to extract uniquely identifying features of that region. It should come as no surprise that in many job sites, trying to separate one region of the environment from another based on color, hue, or roughness alone would be wildly insufficient. For example, in the case where a wall of a building is to be removed while another wall (similar in color, texture, and size) is to remain untouched, onboard sensors would struggle to differentiate the two walls and appropriately apply the constraints.

A need therefore exists, for a simple and effective system to reduce the likelihood of collisions between machinery and obstacles in the work area.

Prior art related to the invention, the contents of which are incorporated herein by reference, include the following:

S. J. Anderson, S. C. Peters, and K. D. Iagnemma, "Predictive Semi-Autonomous Vehicle Navigation System," U.S. Patent Application 2010/0228427, filed February 2010

S. J. Anderson, S. C. Peters, and K. D. Iagnemma, "Methods and Apparatus for Predicting and Quantifying Threat Being Experienced by a Modeled System," International Application Number PCT/US10/42201, filed July 2010

S. J. Anderson, S. C. Peters, and K. D. Iagnemma, "Methods and Apparati for Providing an integrated Framework for Vehicle Operator Assistance based on a Trajectory Prediction and Threat Assessment Obtained via Constrained Optimal Control," International Application Number PCT/US10/42203, filed July 2010

Anderson, S. J, Peters, S. C., Pilutti, T. P., Iagnemma, K. D., "An Optimal-Control-Based Framework for Trajectory Planning, Threat Assessment, and Semi-Autonomous Control of Passenger Vehicles in Hazard Avoidance Scenarios", International Journal of Vehicle Autonomous Systems, Vol. 8, Nos. 2/3/4, pp 190-216.

SUMMARY OF THE INVENTION

The present invention utilizes passive radio transponders that are embedded in tape, grease, or similar materials that are applied to objects where collisions must be avoided. An active, interrogating transponder is then mounted on the moving machinery and uses the information provided by the radio transponders to ensure that marked objects are avoided.

Applicants believe the invention is novel in at least two areas: (1) the use of radios to target or exclude regions of the environment from the operating space of a semi-autonomous controller; and (2) the use of a semi-autonomous controller (rather than a simple warning system, emergency-stop, or full-fledged autonomous controller) to assist the operator in avoiding hazards.

Advantages to the present invention include the ability to operate at FCC-regulated power levels in RFID bands. These power levels are lower than levels required for radars. Other advantages include the ability to mark non-metallic obstacles and the ability to specifically identify obstacles based on modulated RFID tag returns.

BRIEF DESCRIPTION OF THE DRAWINGS

The present invention is further described with reference to the accompanying drawings wherein:

FIG. 8 is a photograph showing metal installation in a preferred embodiment of the invention.

FIG. 17 is a schematic diagram showing a collision logic diagram in a preferred embodiment of the invention.

DETAILED DESCRIPTION OF THE PREFERRED EMBODIMENT

Figure 1:
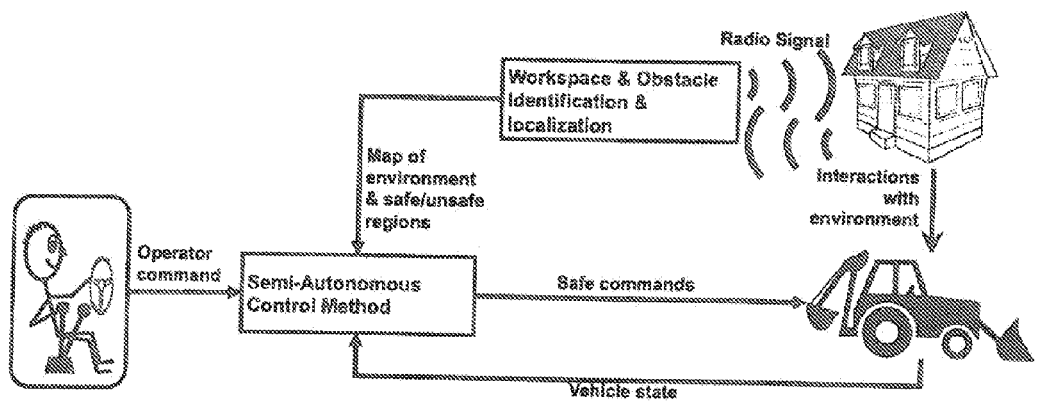
FIG. 1 depicts a block diagram of the radar-assisted semi-autonomous control system.

The method and apparatus disclosed herein provide a fast, inexpensive, and robust means of preventing unintended collisions between a human-controlled machine (e.g., forklift, excavator, medical instrument, industrial manipulator, etc.) and hazardous or impassible regions of the environment (warehouse shelving, gas piping, unintended organs, pedestrians, etc.). FIG. 1 shows a block diagram for this system as applied to a scenario in which an excavator performs work near a house. In this case, regions of the house that should not be hit might be tagged beforehand with radio tape, and any gas pipelines near the workspace might be marked with radio emitters. The controller onboard the excavator then reads in the radio signal, designs constraints based on the position of radio emitters, and ensures that neither the excavator tool (e.g., backhoe, jackhammer, etc.) nor the excavator vehicle itself (e.g., tractor body) collides with the house or pipeline. Note that in this system, the human operator is neither hindered nor affected by the controller as long as the operator's control actions are safe and do not put the manipulator in imminent danger. Only when the operator's inputs are predicted to be unsafe (via a forward-simulation of the manipulator dynamics), does the controller intervene, and then only in proportion to the threat posed by the situation. A more detailed description of the semi-autonomous control methods used by this controller can be found in Anderson et al. 2010 and Anderson, Peters, and Iagnemma 2010.

Figure 2:
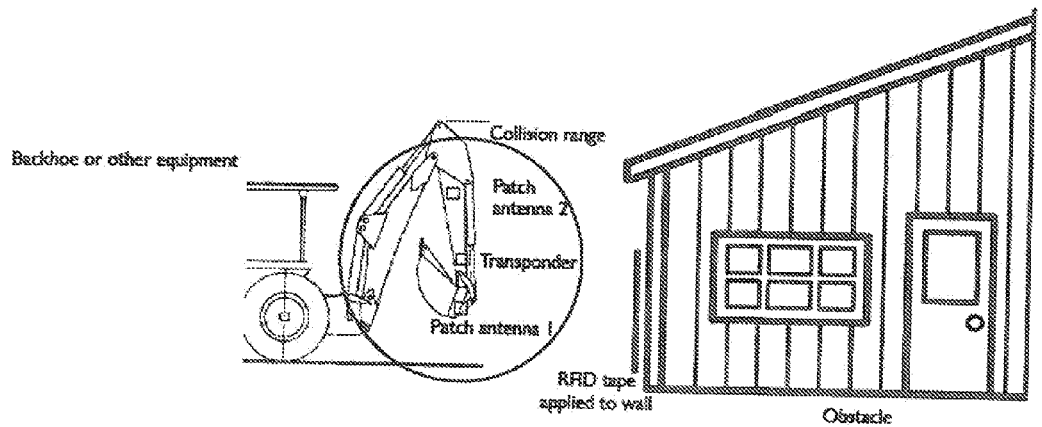
FIG. 2 is a diagram showing the implementation of a transponder on a piece of construction equipment and the location of the RFID component.

Regions of the environment representing either target locations or hazards to be avoided may be tagged with radios using a variety of methods. In one embodiment, tape containing tiny radios spaced at regular intervals may be applied to the corners or edges of a supporting wall that should not be disturbed while demolishing nearby walls or moving nearby equipment. An example of this is seen in FIG. 2. In a warehouse situation, this tape might be applied to the corners of inventory racks, in which case controllers onboard forklifts prevent collisions between forklifts and inventory (Russian Times 2009). For a crane, higher-power radios might be used to tag the corners of buildings around which payloads must safely pass. In transportation, radios could be embedded in the paint used to mark lanes on roadways or instructions on signage. In all cases, once hazardous, no-go, or (conversely) target regions have been marked, the semi-autonomous controller ensures that they are avoided by both the manipulator (e.g., crane payload, backhoe bucket, demolition wrecking ball, forklift tines, etc.) and the vehicle to which the manipulator is affixed (e.g., tractor, forklift, body, etc.).

This invention incorporates a battery-powered transponder mounted on the moving piece of heavy equipment. As the heavy equipment operates, the transponder continually transmits radiofrequency pulses in a manner similar to a radar system. The transmitted pulses are modulated with a pseudorandom binary code known as a chip code as is commonly done in spread spectrum communications, including cellular telephony. At the same time, the transponder listens for returns from nearby radio tags in the form of small radios embedded in paint or tape.

The transponder output power is likely limited to a few watts in accordance with FCC regulations. When a tag located in the near field of the transponder, experiments have shown that the amount of power collected from the transponder by each radio in the tag is likely to be a few hundred microwatts. If the radios in the paint or tape contain small batteries, this signal level is sufficient to trigger a return signal on a frequency different than that of the transmit frequency. If the radios in the tag do not have batteries, the radios in the tags must be designed to passively modulate and retransmit the energy received from the transponder.

Either way, the transponder continually listens for returns from the radio tags. It is desirable to transmit fairly wideband pulses (roughly 100 MHz) thereby accommodating higher resolution pseudorandom chip sequences. Each tag sends back a modulated version of the chip sequence. Transmitting sufficient power to the tags to generate a return signal from the small tags may require a trickle charging approach incorporating the hysteric switch described in U.S. Pat. Nos. 7,970, 357 and 8,010,048, especially for passive tags. The approach works with passive, active tags, with or without trickle charging.

The transponder receiver digitizes the return channel, continually searching for chip codes corresponding to the radios in the tags. When a chip code correlates with the return signal, the transponder estimates the range to the obstacle by the time delay in the correlation. By obtaining sufficient signal to noise due to integrating multiple returns from the same tag, resolution of a few feet may be obtainable from pulse bandwidths of approximately 100 MHz. That is, the system resolution depends on tag bandwidth. Given that light travels one foot per nanosecond and one can gain roughly an order of magnitude resolution improvement through signal processing, it is desirable to obtain tag bandwidths of about 100 MHz to get one foot resolution. A 10 MHz bandwidth is more realistic for RFID bands, so resolution is about ten feet without integrating many returns from the tags. If one can integrate multiple returns from tags and achieve sufficiently high signal-to-noise to resolve pulses edges within a fraction of the pulse period, one can attain about 1 foot resolution.

This correlator may be built using a general-purpose microprocessor, a field-programmable gate array or an application-specific integrated circuit. Note that the transponder automatically detects close-range metallic objects due to unmodulated returns on the transmit frequency. Code correlation may be used to separate the return signal from the transmit signal.

The radios that are embedded in tapes or paints are tiny passive radiofrequency identification (RFID) transponders. A key aspect of these small radios is the antenna. For non-conductive obstacles, a pair of crossed wire dipoles is an easy way to collect the transponder signals. If the tag contains a battery, it can transmit bursts in response to the interrogator. However, battery-powered tags will eventually lose batter power and need recharging.

Tracking metal obstacles is ordinarily more difficult because RFID antennas mounted on metal are more complex and expensive. However, this problem can be avoided because the interrogator is a pulse modulated radar and automatically detects and resolves returns from metal because the radar cross section is large enough to detect the reflections from close objects. One only needs to tag the non-metallic obstacles having a low radar cross section. For example, one may want to run a ribbon along the edge of a ditch in order to keep equipment out of the ditch. The metallic antennas in the ribbon will create a radar cross section.

It may be desirable to create passive RFID tags capable of modulating the transmit signal at a 100 MHz chip rate and then retransmitting on a different frequency. These methods are known in the RFID tag art. Also incorporated by reference is U.S. application 61/188,738 by Niedzwiecki et al. describing optimal modulations for multiple RFID tags operating in the same vicinity.

Figure 3:
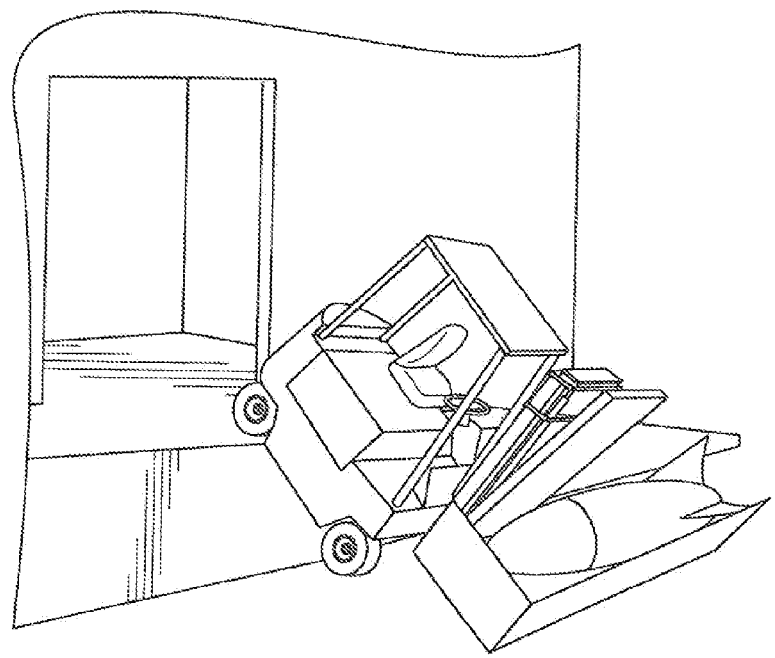
FIGS. 3-4 illustrate various use cases for the invention.
Figure 4:
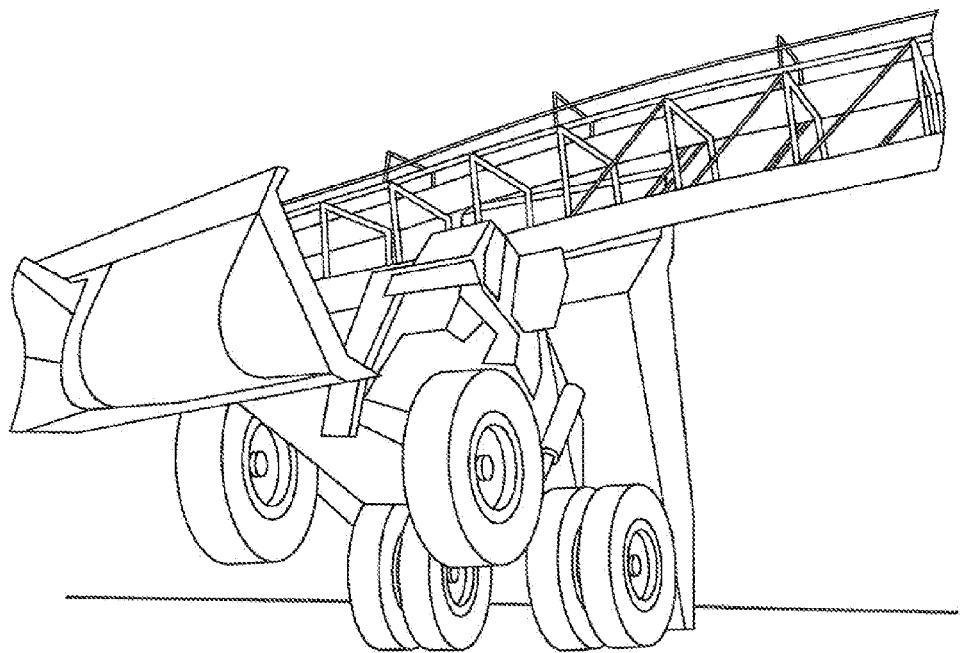
Figure 5:
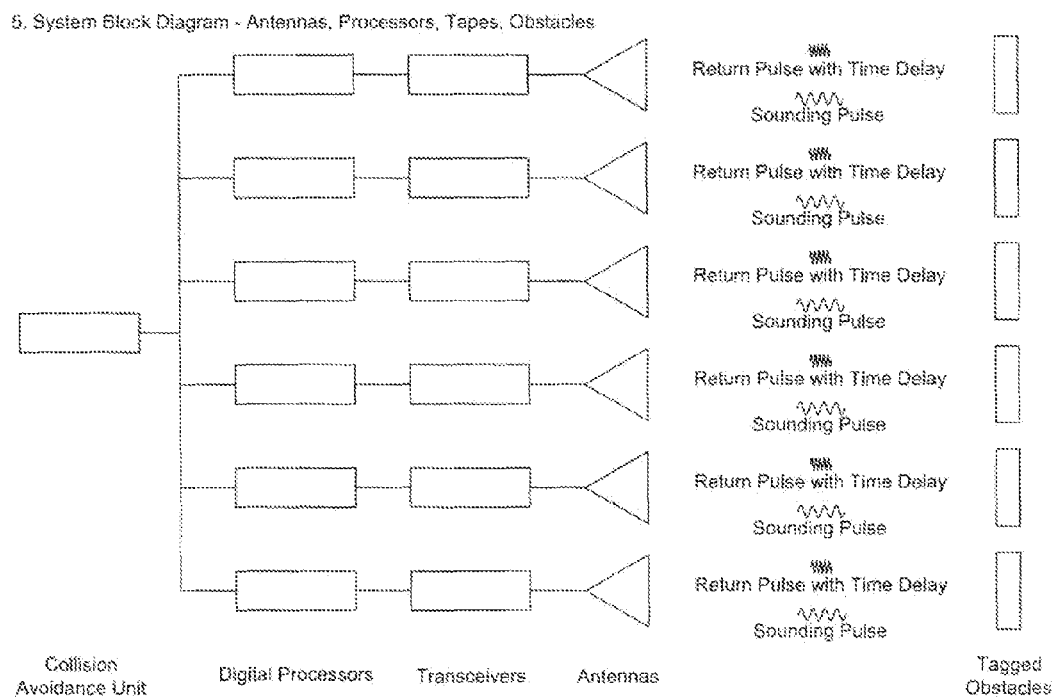
FIG. 5 is a schematic black diagram showing a preferred embodiment of the system of the invention.

FIGS. 3-5 are presented simply to illustrate various use cases for this invention. Note that each of these accidents were caused by operator error and could therefore have been avoided had the above-described radio-enabled semi-autonomous controller been in use.

FIG. 3 shows an incident in which a forklift operator drove over the edge of the loading ramp. In situations like these (at factories, supermarkets, and warehouses worldwide), expensive radio tape or radio paint would be used to mark the edge of curbs, shelves, and pallet racks, and the semi-autonomous controller running onboard the forklift would be configured to intervene only as necessary to ensure that the vehicle does not violate the boundaries set by these radios.

FIG. 4 shows a crane that has tipped due to improper loading and/or overextension of its payload. The semi-autonomous controller described by this invention is capable of not only ensuring that the crane does not hit nearby houses during normal operation, but also of ensuring that the system remains stable during operation.

FIG. 5 shows the collision avoidance system. Because a piece of moving machinery occupies a time-varying volume, it incorporates a set of antennas intended to cover the extremities of the machinery. Each antenna connects to a transceiver that broadcasts an orthogonal pulse-either on a separate frequency, time slot or code. Otherwise, pulses from one end of the equipment look like reflections from nearby objects at the other end of the equipment. These pulses can simplify reflect off obstacles in a manner known from traditional collision avoidance radars or they can be transponded using conventional passive or active RFID tags as well as special regenerative RFID tags described in previous patents. Each transceiver connects to a digital processor that detects return pulses and estimates time delays, thereby estimating distance to the nearest obstacles of interest, using the rule that the speed of light is about one foot per nanosecond. Each digital processor reports reflection times back to the collision avoidance unit, which uses the information regarding obstacle ranges to modify control laws for the moving machinery.

Figure 6:
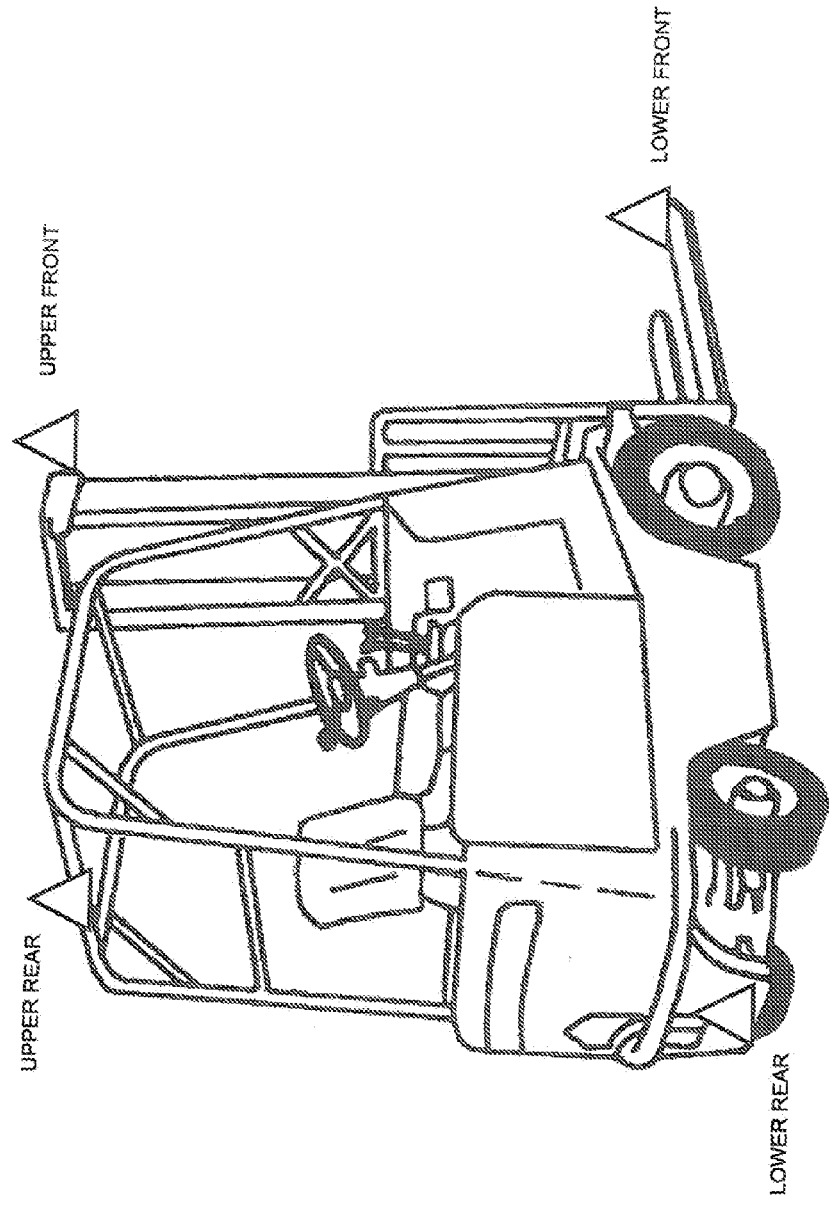
FIG. 6 is a perspective view of a vehicle showing antenna placement in a preferred embodiment of the invention.

FIG. 6 shows an example of the coverage for a fork lift. In this example, four antennas cover situations where the forklift might back into high or low obstacles, the lift might bump into an obstacle or the front might bump into a high obstacle. In order to work with only four channels, the minimum range might be set to ensure that the rear corners do not bump even when coverage is provided from a central antenna. Using elementary geometry, this minimum distance would be about three feet if the fork lift is about four feet wide. If this distance is too large, more antennas should be added to cover the corners of the forklift.

Figure 7:
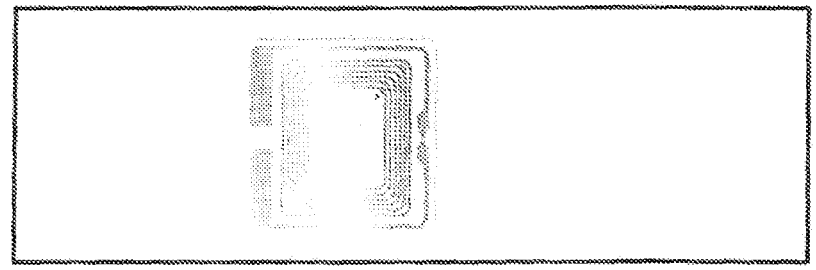
FIG. 7 is a photograph showing plastic installation a preferred embodiment of the invention.

FIG. 7 shows an RFID transponder installed on a plastic obstacle that does not significantly interact electromagnetically with the RFID antenna. In this case a conventional RFID antenna will work. If the obstacle is large, an ensemble of RFID antennas should be placed along the obstacle, consistent with the minimum approach distance to the obstacle. Where more signal return is necessary, each RFID antenna can connect to an RFID tag. In the case of active regenerative tags or hysteretic tags, the detection performance will improve.

FIG. 8 shows an RFID transponder installed on a metallic obstacle. In this case, the metal may sufficiently reflect the interrogation pulses so that no antennas are needed. However, if addition signal return is desired, antennas from RFID tags designed for placement on metal must be used. Generally these tags consist of loop-like antennas mounted on dielectric substrates that prevent the antenna from shorting out against the conductive plane of the surface. In this case, using a regenerative or hysteretic RFID will augment the effective reflecting cross section of the obstacle and improve detection performance.

Figure 9:
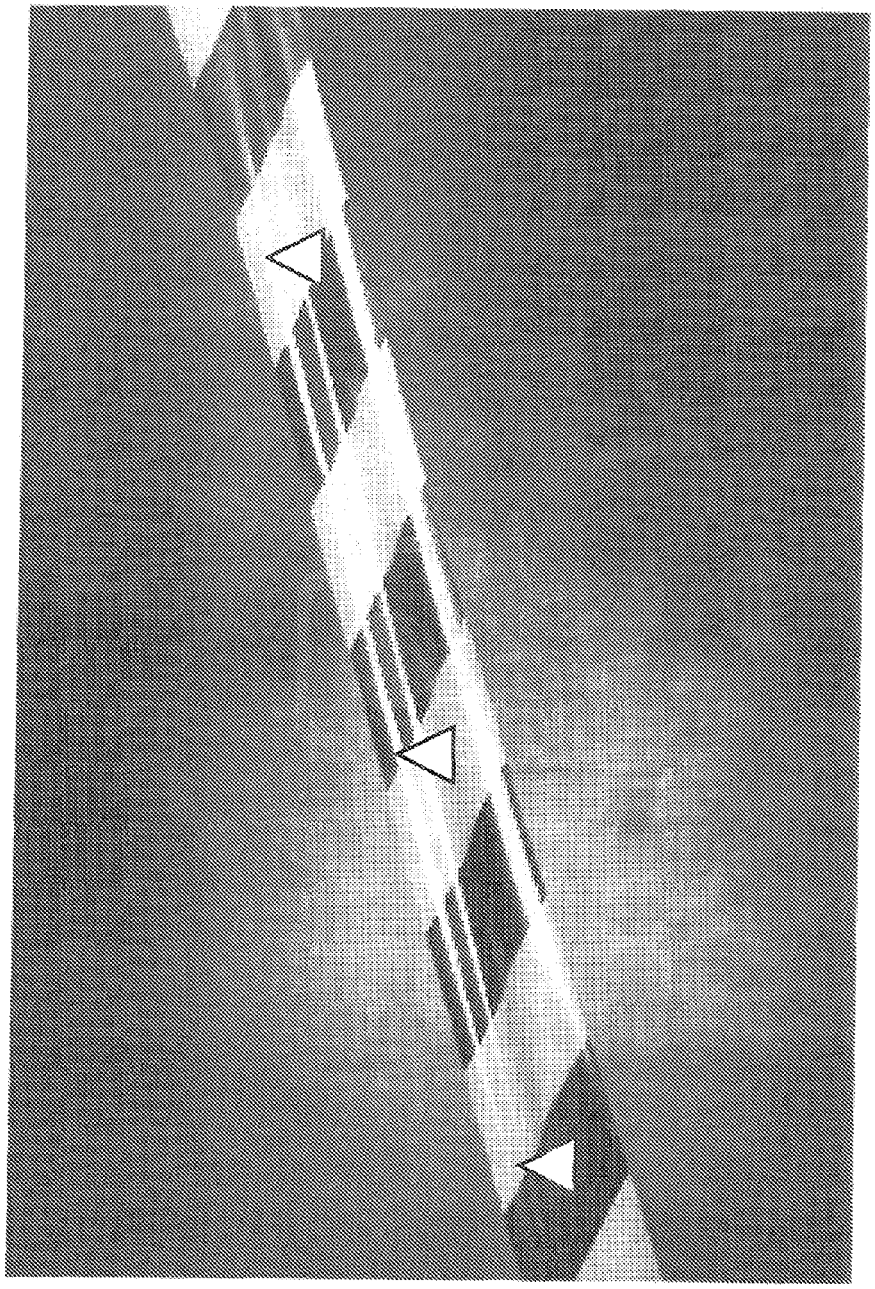
FIG. 9 is a photograph showing free space installation in a preferred embodiment of the invention.

FIG. 9 shows conventional obstacle tape modified by period emplacement of RFID antennas or tags in the tape. Again desired closeness to obstacles determines tag spacing in the tape. In the limit where nearly continuous regenerative reflections are desired, the tape or other obstacles may be painted with a colloid having regenerative micro radios in suspension in a manner described in U.S. Pat. No. 8,010,048, the contents of which are incorporated herein by reference.

Figure 10:
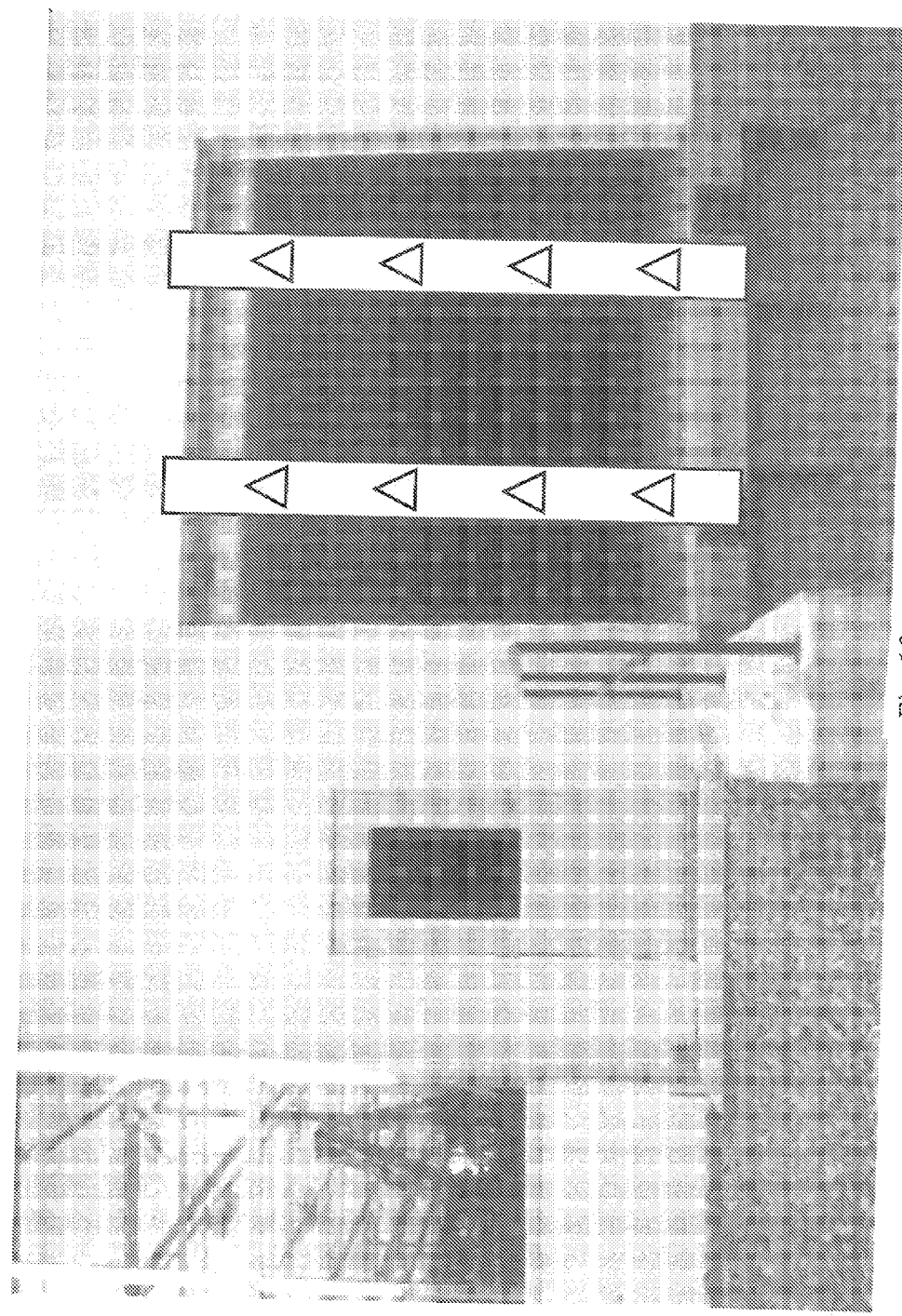
FIG. 10 is a photograph showing tape embedded with RFID tags used in a preferred embodiment of the invention.

FIG. 10 shows how obstacle tape hung across an open doorway can prevent a forklift or other moving machinery from driving off the edge of a loading dock. Ordinary obstacle tape would not work, but tape embedded with RFID tags provides sufficient return signal to activate the collision warning system.

Figure 11:
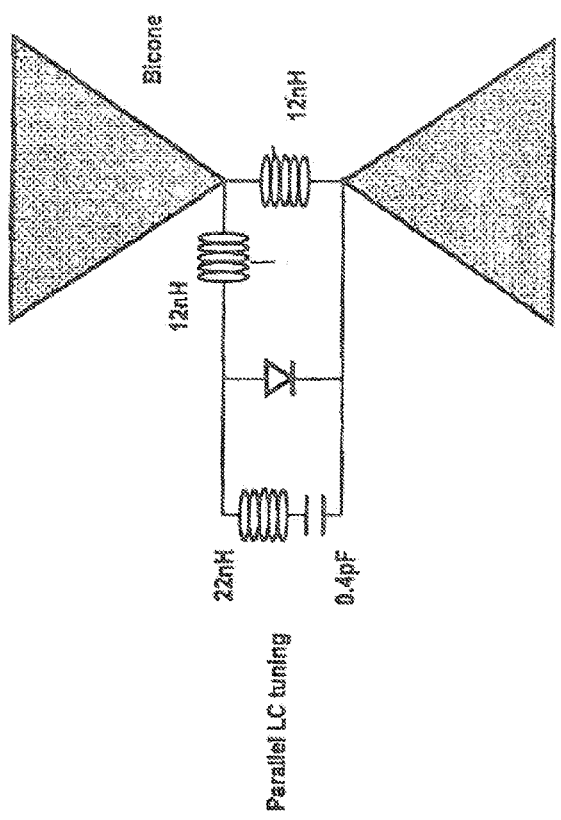
FIG. 11 is a schematic drawing showing a backscatter tag used in a preferred embodiment of the invention.

FIG. 11 is a diagrammatic illustration of parallel LC tuning for a diode tag coupled to a bicone antenna as described in U.S. Pat. No. 8,044,797, the contents of which are incorporated herein by reference.

Figure 12:
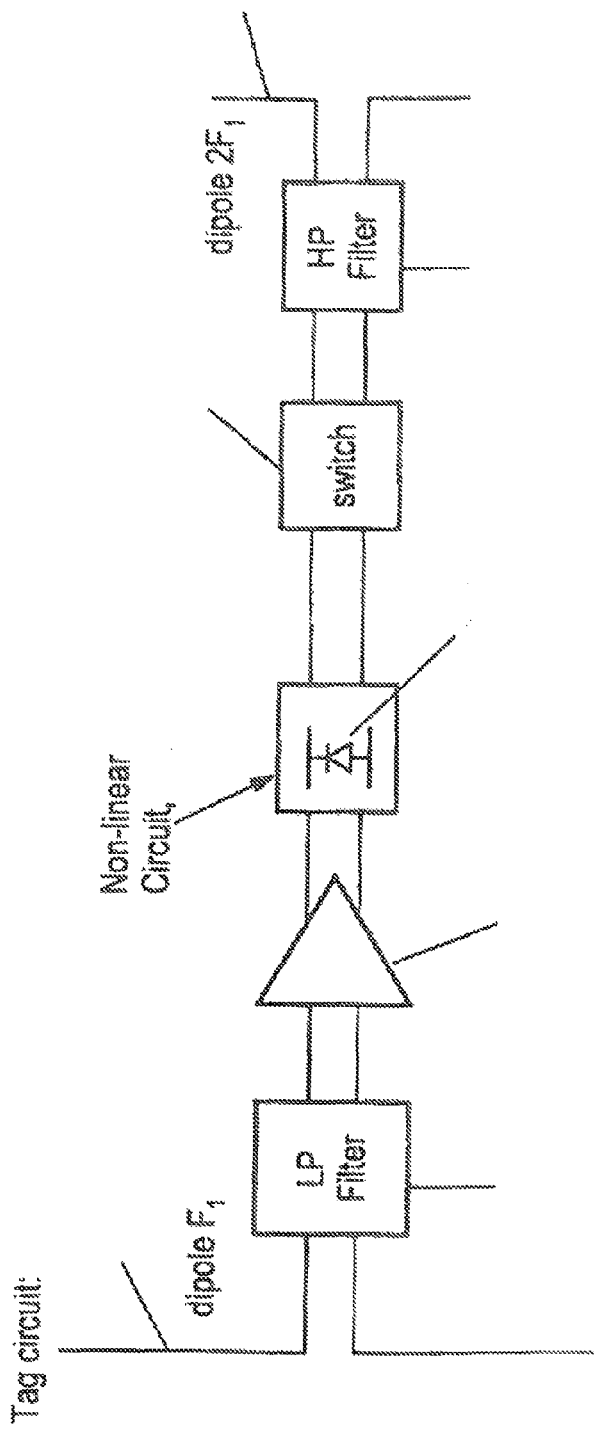
FIG. 12 is a schematic drawing showing an active tag used in a preferred embodiment of the invention.

FIG. 12 is a block diagram of a tag circuit including a dipole coupled to a low-pass filter in turn coupled to an amplifier and a non-linear circuit such as a diode followed by a switch and a high-pass filter to produce a harmonic backscattered signal as described in U.S. Pat. No. 8,044,797.

Figure 13:
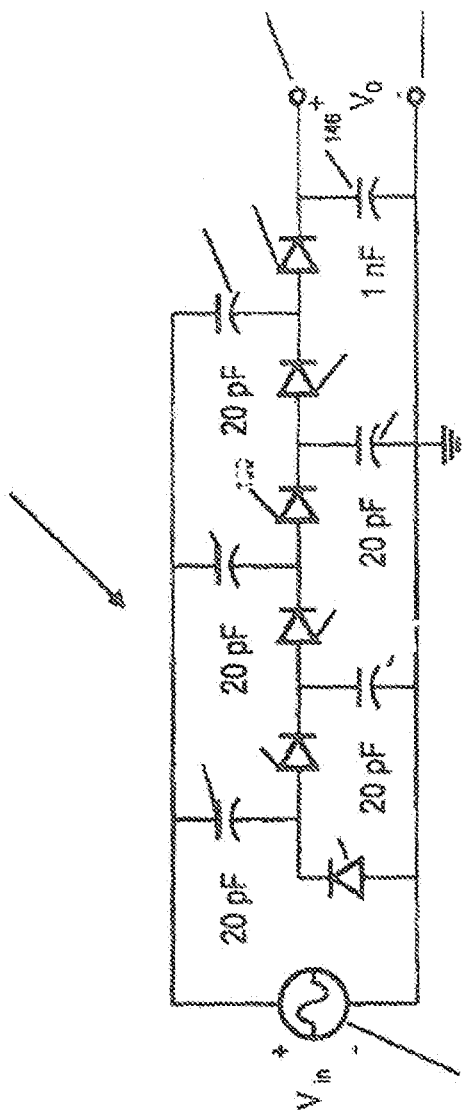
FIG. 13 is a schematic drawing showing a voltage multiplication circuit used in a preferred embodiment of the invention.

FIG. 13 is a block diagram of a rectenna-type diode circuit utilized to multiply the RF voltage from the interrogation signal to power hysteretic regenerative tags as described in U.S. Pat. No. 8,044,797.

Figure 14:
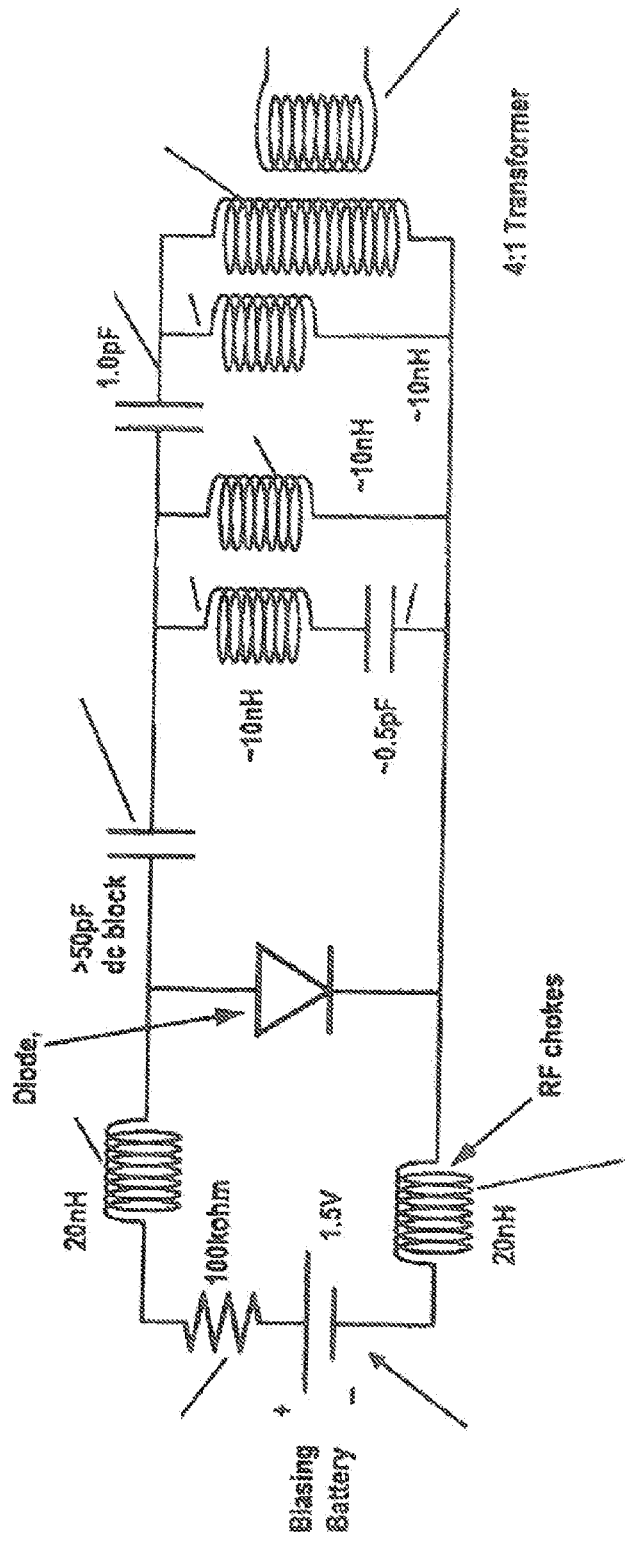
FIG. 14 is a schematic drawing showing a biased tag used in a preferred embodiment of the invention.

FIG. 14 is a schematic diagram illustrating the utilization of a biasing battery which extends the range of a tag employing a diode as described in U.S. Pat. No. 8,044,797.

Figure 15:
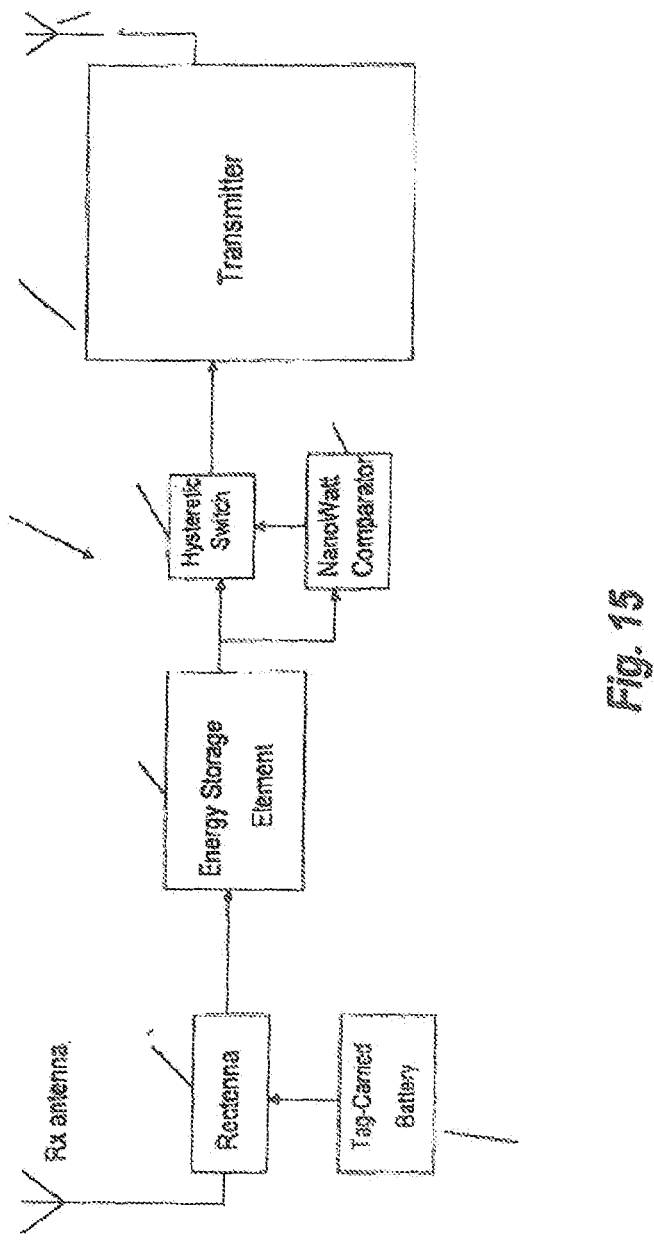
FIG. 15 is a schematic drawing showing a hysteretic switch tag used in a preferred embodiment of the invention.

FIG. 15 is a block diagram of a regenerative tag that uses a battery-biased rectenna diode rectifier circuit from scavenging energy from an interrogation beam to provide a detection enhancement by means of firing a return pulse when sufficiency energy has been stored as determined by the hysteretic switch as described in U.S. Pat. No. 8,044,797.

Figure 16:
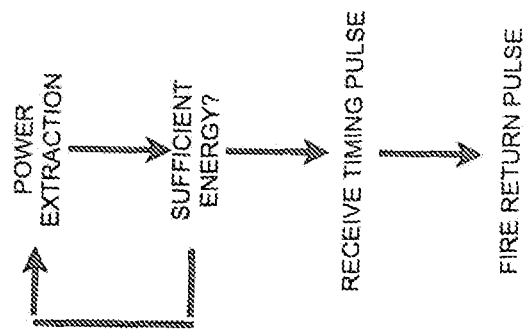
FIG. 16 is a schematic diagram showing a hysteretic timing diagram in a preferred embodiment of the invention.

FIG. 16 shows the logic flow for hysteretic regenerative switch to ensure that the reflecting tag fires back sufficiently quickly to minimize latency and resulting range estimation errors. The tag must store sufficient energy to activate a low-power receiver that waits for a sounding pulse, then transmits immediately in a manner equivalent to a backscatter tag.

FIG. 17 shows the logic for a multichannel collision avoidance system. If any channel reports an obstacle below threshold range, the semi-autonomous controller activates.

The invention is described in connection with the preferred embodiments of the various figures, it is to be understood that other similar embodiments may be used or modifications and additions may be made to the described embodiment for performing the same function of the present invention without deviating there from. Therefore, the present invention should not be limited to any single embodiment, but rather construed in breadth and scope in accordance with the recitation of the appended claims.

What is claimed is:

1. A system for avoiding collisions between an object and one or more parts of a moving machinery, the system comprising:

a material attached to the object, wherein the material is embedded with one or more passive radio transponders; wherein the one or more passive radio transponders passively modulate the received radio frequency pulses; and wherein the one or more passive radio transponders send return signals having a frequency different from that of the received radio frequency pulses;

one or more active interrogating transponders mounted on the one or more parts of the moving machinery, wherein the one or more active interrogating transponders transmit wideband radio frequency pulses and receive multiple return signals from each of the one or more passive radio transponders and integrating multiple return signals by a single active interrogating transponder upon receiving multiple return signals corresponding to a particular passive radio transponder; and a semi-autonomous controller coupled to the moving machinery and configured for semi-autonomously controlling the movement of the moving machinery or the one or more parts of the moving machinery based on the distance between the object and the moving machinery or the one or more parts of the moving machinery, wherein the distance between the object and the moving machinery is based on time delay in correlating the radio frequency pulses with the return signals.

2. The system as claimed in claim 1, wherein the moving machinery is either a forklift, or an excavator, or a crane, or a medical instrument, or an industrial manipulator.

3. The system as claimed in claim 1, wherein the object is either a house, or a warehouse shelving, or a gas piping, or an organ, or an inventory rack.

4. The system as claimed in claim 1, wherein the material is selected from the group consisting of tape, grease, and paint.

5. The system as claimed in claim 1, wherein the one or more passive radio transponders are spaced at regular intervals.

6. The system as claimed in claim 1, wherein the active interrogating transponder is powered by a battery.

7. The system as claimed in claim 1, wherein the one or more passive radio transponders contain a battery.

8. The system as claimed in claim 7, wherein the one or more passive radio transponders transmit bursts in response to the received radio frequency pulses.

9. The system as claimed in claim 1, wherein the one or more passive radio transponders do not contain a battery.

10. The system as claimed in claim 1, wherein the active interrogating transponder is a pulse modulated radar.

11. A system for avoiding collisions between an object and one or more parts of a moving machinery, the system comprising:
　a material attached to the object, wherein the material is embedded with one or more passive radio transponders; wherein at least one of the passive radio transponders is a pair of crossed wire dipoles;
　one or more active interrogating transponders mounted on the one or more parts of the moving machinery, wherein the one or more active interrogating transponders transmit wideband radio frequency pulses and receive multiple return signals from each of the one or more passive radio transponders and integrating multiple return signals by a single active interrogating transponder upon receiving multiple return signals corresponding to a particular passive radio transponder; and
　a semi-autonomous controller coupled to the moving machinery and configured for semi-autonomously controlling the movement of the moving machinery or the one or more parts of the moving machinery based on the distance between the object and the moving machinery or the one or more parts of the moving machinery, wherein the distance between the object and the moving machinery is based on time delay in correlating the radio frequency pulses with the return signals.

12. A system for avoiding collisions between an object and one or more parts of a moving machinery, the system comprising:
　a material attached to the object, wherein the material is embedded with one or more passive radio transponders;
　one or more active interrogating transponders mounted on the one or more parts of the moving machinery, wherein the one or more active interrogating transponders transmit wideband radio frequency pulses and receive multiple return signals from each of the one or more passive radio transponders and integrating multiple return signals by a single active interrogating transponder upon receiving multiple return signals corresponding to a particular passive radio transponder; and
　a semi-autonomous controller coupled to the moving machinery and configured for semi-autonomously controlling the movement of the moving machinery or the one or more parts of the moving machinery based on the distance between the object and the moving machinery or the one or more parts of the moving machinery, wherein the distance between the object and the moving machinery is based on time delay in correlating the radio frequency pulses with the return signals; wherein the semi-autonomous controller ensures that the moving machinery remains stable during operation.

13. A system for avoiding collisions between an object and one or more parts of a moving machinery, the system comprising:
　a material attached to the object, wherein the material is embedded with one or more passive radio transponders;
　one or more active interrogating transponders mounted on the one or more parts of the moving machinery, wherein the one or more active interrogating transponders transmit wideband radio frequency pulses and receive multiple return signals from each of the one or more passive radio transponders and integrating multiple return signals by a single active interrogating transponder upon receiving multiple return signals corresponding to a particular passive radio transponder; and
　a semi-autonomous controller coupled to the moving machinery and configured for semi-autonomously controlling the movement of the moving machinery or the one or more parts of the moving machinery based on the distance between the object and the moving machinery or the one or more parts of the moving machinery, wherein the distance between the object and the moving machinery is based on time delay in correlating the radio frequency pulses with the return signals;
wherein the moving machinery comprises:
　a set of antennas covering the extremities of the moving machinery;
　a set of transceivers, wherein each transceiver of the set of transceivers is connected to each antenna of the set of antennas and each transceiver broadcasts an orthogonal pulse either on a separate frequency, or time slot or code;
　a set of digital processors, wherein each digital processor of the set of digital processors is connected to a transceiver of the set of transceivers that detects return pulses and determines time delays, thereby determining distance between the moving machine and the object; and
　a collision avoidance unit connected to the set of digital processors, wherein the collision avoidance unit is configured for controlling the moving machinery for avoiding collision with the object based on the distance between the moving machine and the object.

\* \* \* \* \*